United States Patent
Masuda

(10) Patent No.: US 9,207,847 B2
(45) Date of Patent: Dec. 8, 2015

(54) IMAGE DISPLAY DEVICE, IMAGE DISPLAY METHOD AND PROGRAM

(71) Applicant: FUJIFILM Corporation, Tokyo (JP)

(72) Inventor: Ken Masuda, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/551,347

(22) Filed: Nov. 24, 2014

(65) Prior Publication Data

US 2015/0077376 A1   Mar. 19, 2015

Related U.S. Application Data

(63) Continuation of application No. PCT/JP2013/064202, filed on May 22, 2013.

(30) Foreign Application Priority Data

May 24, 2012   (JP) .................................. 2012-118531

(51) Int. Cl.
```
G06F 3/041      (2006.01)
G06F 3/0484     (2013.01)
G06F 17/30      (2006.01)
G06F 3/0488     (2013.01)
```
(52) U.S. Cl.
CPC ............ *G06F 3/04847* (2013.01); *G06F 3/041* (2013.01); *G06F 3/0488* (2013.01); *G06F 3/04845* (2013.01); *G06F 17/30244* (2013.01); *G06F 17/30268* (2013.01)

(58) Field of Classification Search
CPC ........... H04N 7/18; G06F 1/00; G06F 3/0482; G06F 3/04847; G06F 3/0488
See application file for complete search history.

(56) References Cited

U.S. PATENT DOCUMENTS

2012/0300066 A1* 11/2012 Park .............................. 348/143

FOREIGN PATENT DOCUMENTS

| JP | 2003-199028 | 7/2003 |
|---|---|---|
| JP | 2006-350546 | 12/2006 |
| JP | 2009-123196 | 6/2009 |
| JP | 2010-283691 | 12/2010 |

OTHER PUBLICATIONS

International Search Report PCT/JP2013/064202 dated Jun. 18, 2013.
International Preliminary Report on Patentability, dated Dec. 4, 2014, in corresponding International Application No. PCT/JP2013/064202.

* cited by examiner

*Primary Examiner* — Michael Faragalla
(74) *Attorney, Agent, or Firm* — Young & Thompson

(57) ABSTRACT

In the image display device, The touch operation detection unit detects the touch operation of the user input through the touch panel; The image selection unit selects images in the category corresponding to the tag information specified through the touch operation from among the images stored in the image storage unit based on the tag information; and the display control unit extracts main subject areas of the images in the category selected by the image selection unit based on the frame information, and displays the extracted main subject areas on the screen of the touch panel in a predetermined order according to an image display procedure corresponding to the tag information specified through the touch operation.

21 Claims, 6 Drawing Sheets

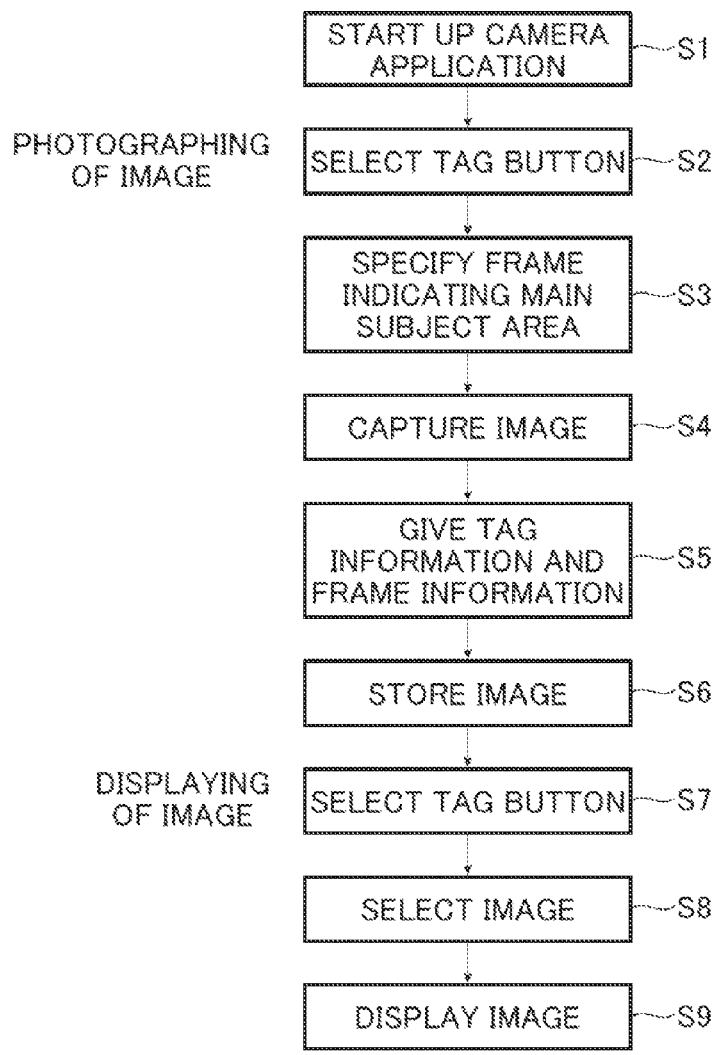
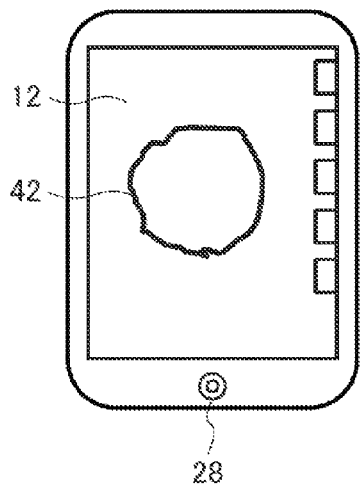
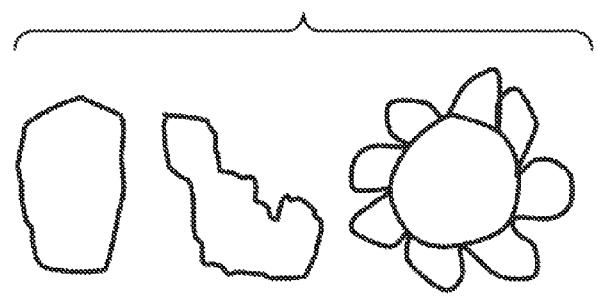

IMAGE DISPLAY DEVICE, IMAGE DISPLAY METHOD AND PROGRAM

CROSS-REFERENCE TO RELATED APPLICATIONS

This application is a Continuation of PCT International Application No. PCT/JP2013/64202 filed on May 22, 2013 which claims priority under 35 U.S.C. §119(a) to Japanese Patent Application No. 2012-118531 filed May 24, 2012. The above application is hereby expressly incorporated by reference, in its entirety, into the present application.

BACKGROUND OF THE INVENTION

The present invention relates to an image display device, an image display method and a program in which a large number of images are one-dimensionally reproduced and displayed.

BACKGROUND ART

Currently, with the spread of digital cameras, cellular phones having a camera function, or the like, photographing of images (photographs) is freely performed. As a result, a large number of images are accumulated, and it is required to efficiently organize and display the large number of images.

Here, for example, when a set of images to be sorted into A, B and C is randomly stored in one place, organizing of the images means that the images stored in one place are sorted into A, B and C, and stored over again.

For example, in the case where photographing of an image and storage of the image photographed are repeatedly performed, and as a result, a large number of images are stored in one folder, conventionally, in order to organize the large number of images stored in one folder, for example, a work of separately creating a plurality of folders for sorting and sequentially moving an image from the one folder having the large number of images stored therein to the corresponding folder for sorting is manually performed.

In addition to the above method for organizing images, many methods for organizing a large number of images have been proposed in the prior art. In contrast, hardly any methods for displaying a large number of images have been proposed, except for, for example, display in a slide show or thumbnail format.

For example, Patent Literature 1 (JP 2003-199028 A) describes an electronic album device that converts a captured image into image data which electrically represents the captured image, records the image data, and reproduces the image data, in which a plurality of pieces of image data are automatically classified into groups for each category on the basis of basic attributes such as a file name, a date, or the like attached to each image data, and displayed together with thumbnails, the number of images belonging to the group, and photographing date and time on a screen.

SUMMARY OF THE INVENTION

An object of the present invention is to provide an image display device, an image display method and a program capable of solving the problems of the prior art and efficiently reproducing and displaying a large number of images.

To achieve the above object, the present invention provides an image display device that displays an image to which tag information indicating a category and frame information indicating a main subject area have been given, the device comprising:

a touch panel configured to receive an instruction input through a touch operation performed by a finger of a user coming in contact with a screen of the touch panel;

a touch operation detection unit configured to detect the touch operation of the user input through the touch panel;

an image storage unit configured to store the image to which the tag information and the frame information have been given;

an image selection unit configured to select images in a category corresponding to the to information specified through the touch operation from among the images stored in the image storage unit based on the tag information; and a display control unit configured to extract main subject areas of images in the category selected by the image selection unit based on the frame information, and display the extracted main subject areas on the screen of the touch panel in a predetermined order according to an image display procedure corresponding to the tag information specified through the touch operation.

Also, the present invention provides an image display method for displaying an image to which tag information indicating category and frame information indicating a main subject area have been given, the method comprising:

a touch operation detection step of detecting a touch operation of a user that is input through a touch panel that receives an instruction input through the touch operation performed by a finger of the user coming in contact with a screen of the touch panel;

an image selection step of selecting images in a category corresponding to the tag information specified through the touch operation from among images which are stored in an image storage unit and to which the tag information and the frame information have been given, based on the tag information; and an image display step of extracting main subject areas of the selected images in the category based on the frame information, and displaying the extracted main subject areas on the screen of the touch panel in a predetermined order according to an image display procedure corresponding to the tag information specified through the touch operation.

Also, the present invention provides a non-transitory computer-readable recording medium having a program recorded thereon for causing a computer to execute the respective steps of the image display method described above.

In the present invention, it is possible to select the images in the category corresponding to the tag information specified through the touch operation from a large number of images stored in the image storage unit, extract the main subject areas that are attention areas of most interest for a user from the selected images in the category based on the frame information, and efficiently reproduce and display the extracted main subject areas on the screen of the touch panel in a predetermined order according to an image display procedure corresponding to the tag information specified through the touch operation.

BRIEF DESCRIPTION OF THE DRAWINGS

FIG. 12 is a flowchart illustrating an operation of the image display device illustrated in FIGS. 1A and 1B and FIG. 2.

FIG. 13A is a conceptual diagram illustrating a state in which a display frame indicating a main subject area is specified through a touch operation, and FIG. 13B is a conceptual diagram illustrating another shape of the display frame indicating the main subject area.

DETAILED DESCRIPTION OF THE INVENTION

Hereinafter, an image display device, an image display method and a program of the present invention will, be described in detail based on preferred embodiments illustrated in the accompanying drawings.

Figure 1A:
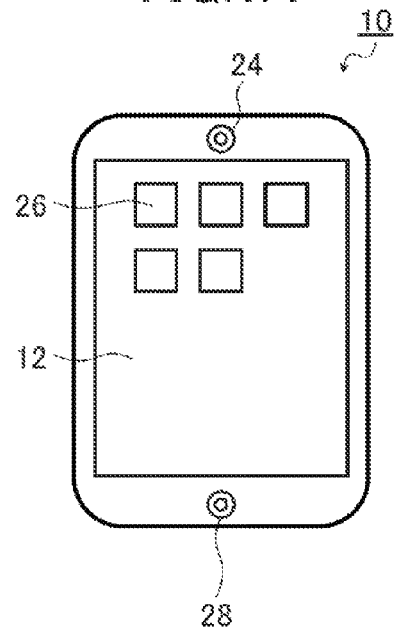
FIGS. 1A and 1B are conceptual diagrams illustrating an appearance of an image display device according to an embodiment of the present invention.
Figure 1B:
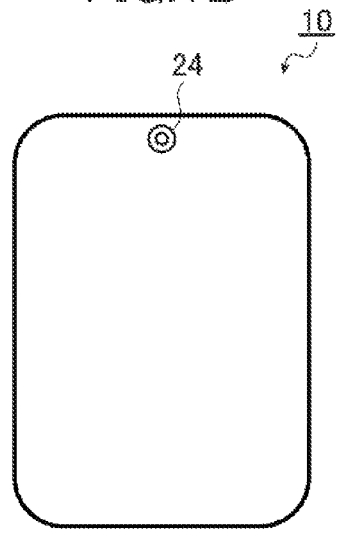
Figure 2:
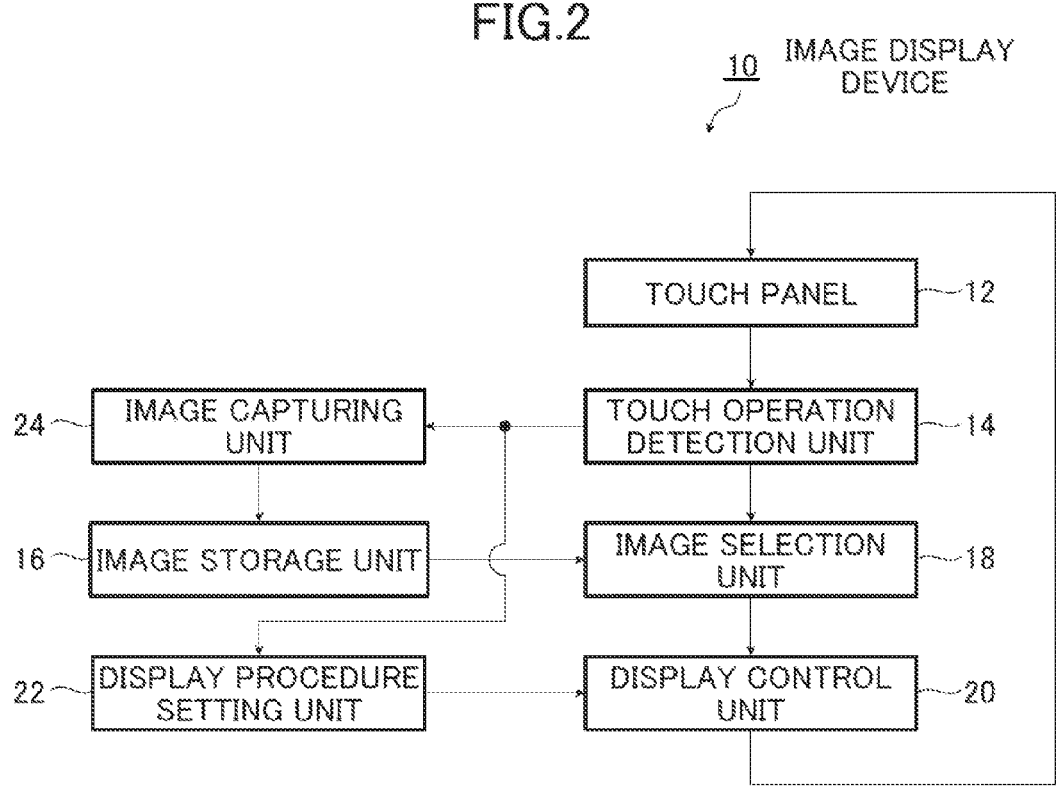
FIG. 2 is a block diagram illustrating a configuration of the image display device illustrated in FIGS. 1A and 1B.

FIGS. 1A and 1B are conceptual diagrams illustrating an appearance of an image display device according to an embodiment of the present invention, and FIG. 2 is a block diagram illustrating a configuration of the image display device illustrated in FIGS. 1A and 1B. The image display device 10 illustrated in FIGS. 1A and 1B is a portable terminal such as a smartphone that one-dimensionally displays images with tag information indicating a category and frame information indicating a main subject area, and is configured with a touch panel 12, a touch operation detection unit 14, an image storage unit 16, an image selection unit 18, a display control unit 20, a display procedure setting unit 22, and an image capturing unit 24, as illustrated in FIG. 2.

The touch panel 12 is arranged on a front surface of the image display device 10, as illustrated in FIG. 1A.

The touch panel 12 is a combination of an information display unit such as a liquid crystal panel and a position input device such as a touch pad, and displays various information and receives an instruction input through a touch operation made by a user causing a finger to come in contact with the screen.

Examples of the touch panel 12 include various types in addition to a resistance film type and an electrostatic capacitance type, and any type capable of inputting an instruction through a touch operation can be used in the image display device 10.

Icons 26 of a plurality of application programs are displayed side by side on the screen of the touch panel 12, as illustrated in FIG. 1A.

Figure 3:
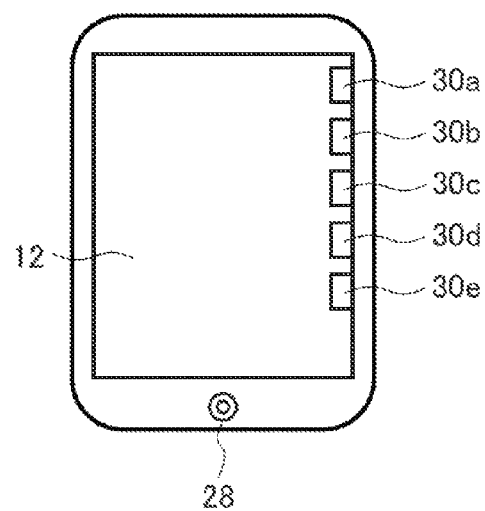
FIG. 3 is a conceptual diagram illustrating a state of a screen of a touch panel when a camera application that executes an image display method of the present invention is started up in the image display device illustrated in FIGS. 1A and 1B.

In the case of this embodiment, when the user taps a predetermined icon 26 with a finger through a touch operation to start up a program of a camera application which executes the image display method of the present invention, five tag buttons 30a, 30b, 30c, 30d, and 30e corresponding to tag information indicating five categories of a favorite image, an image of concern, an important image, an image desired to be viewed and desired to be shown, and tentative photographing are displayed along a right side of the screen of the touch panel 12, as illustrated in FIG. 3.

The touch operation detection unit 14 detects a touch operation of the user input through the touch panel 12.

In the case of this embodiment, the user taps a predetermined tag button through a touch operation (touches an operation target with a finger and immediately detaches the finger from the operation target) to select images in the category corresponding to the tag button, that is, the tag information indicating a category, or to set an image display procedure corresponding to the tag button.

The image storage unit 16 stores images (photographs) to which the tag information indicating a category and the frame information are given, that is, image data thereof.

The image storage unit 16 may store images captured by a digital camera or the like, as well as the images captured by the image capturing unit 24.

Further, the image storage unit 16 may store all images in one folder, or may sort the respective images based on the tag information indicating a category and may store the images in folders for sorting which correspond to the respective, images to classify the images.

The image selection unit 18 selects images in the category corresponding to the tag information indicating a category (tag button) specified through a touch operation from among the images stored in the image storage unit 16 based on tag information indicating a category of each image.

In the case of this embodiment, the image selection unit 18 selects the images in the category corresponding to the tag button specified through a touch operation among the five tag buttons 30a to 30e corresponding to the tag information indicating a category, which are displayed on the screen of the touch panel 12.

The display control unit 20 extracts main subject areas of the images in the category selected by the image selection unit based on the frame information of the respective images, and one-dimensionally displays the extracted main subject areas on the screen of the touch net 12 in a predetermined order according to the image display procedure corresponding to the tag information indicating a category (tag button) which is specified through the touch operation.

Here, the main subject area is an area specified by a display frame indicating an area in which the main subject is included, based on the frame information, and is an attention area of most interest for the user.

Here, the display control unit 20 can display the main subject areas of the images in the category selected by the image selection unit 18, for example, in an order of photographing date and time of the images in the category selected by the image selection unit 18. Further, the display control unit 20 can select predetermined similar images from among the images in the category selected by the image selection unit 18 and display the similar images. In this case, the display control unit 20 can display the similar images in an order of evaluation values of the similar images.

Here, the evaluation value of the similar image can be obtained by causing the display control unit 20 to perform an image analysis processing, for example, such as face detection processing, brightness determination processing, color evaluation processing, and blur evaluation processing on each similar image. The display control unit 20, for example, can display the similar images in descending order of the evaluation value, display the similar images in ascending order of the evaluation value, or display only similar images having evaluation values equal to or greater than a predetermined threshold.

Further, a display switching unit (not illustrated) may be further included in the image display device 10, such that as the above-described predetermined order, the display control unit 20 can perform switching between displaying of the images in the category selected by the image selection unit 18 in an order of photographing date and time of the images, and selecting of predetermined similar images from the images in the category selected by the image selection unit 18 and displaying of the similar images in an order of evaluation values of the similar images.

Further, the display control unit 20 can display at least one of adjacent image information, similar image information, mutual information, spatial information, and total time information, at the same time as displaying an image on the screen of the touch panel 12.

The adjacent image information is information indicating whether two images having a consecutive display order (for example, a consecutive order of photographing date and time) are adjacent images between which a difference in photographing date and time is equal to or less than a predetermined period of time. The predetermined time is, for example, 30 minutes, but is not limited thereto and may be arbitrary time.

The similar image information is information indicating whether two images having a consecutive display order are similar images.

The mutual information is information indicating whether an image captured in the same time zone as the image being displayed is included among images in another category.

The spatial information is information indicating whether an image for which a display frame having the same shape as the display frame indicating the main subject area of the image being displayed is specified is included among images in another category.

The total time information is information indicating a time difference between an image having an oldest photographing date and time and an image having a most recent photographing date and time among the images in the category corresponding to the tag button specified through a touch operation, that is, the tag information indicating a category.

The display procedure setting unit 22 has a function of changing an image display procedure corresponding to an existing tag button through a touch operation, a function of adding a new tag button corresponding to a newly set image display procedure, and the like.

The display control unit 20 controls display of the images according to the image display procedure set by the display procedure setting unit 22.

The image capturing unit 24 is a device that captures an image, such as a camera. In the case of this embodiment, the image capturing units 24 are arranged on each of the front surface and the back surface of the image display device 10 one by one, as illustrated in FIGS. 1A and 1B. The camera on the front surface is for self photographing, and the camera on the back surface is for general photographing.

At the time of photographing of an image, an image received by the image capturing unit 24 is displayed on the screen of the touch panel 12, the image is captured by the image capturing unit 24 when the user pushes a shutter button 28, and image data thereof is stored in the image storage unit 16.

The image capturing unit 24 gives tag information indicating the category corresponding to the tag button tapped through the touch operation, and the frame information to the captured image.

Next, the image display procedure will be described using a specific example.

Hereinafter, swing reproduction, seesaw reproduction, bubble reproduction, touch reproduction, and tempo reproduction will be described as an image display procedure corresponding to tag information indicating categories such as a favorite image, an image of concern, an important image, an image desired to be viewed and desired to be shown, and tentative photographing.

When a tag button at the top (a first tag button) 30a is tapped among the five tag buttons 30a to 30e displayed along the right side of the screen of the touch panel 12 as illustrated in FIG. 3, the display control unit 20 starts the swing reproduction.

In the swing reproduction, after the first tag button 30a is tapped, the finger of the user is slid (flicked) in an arbitrary direction in a state in which the finger comes in contact with the first tag button 30a.

Figure 4:
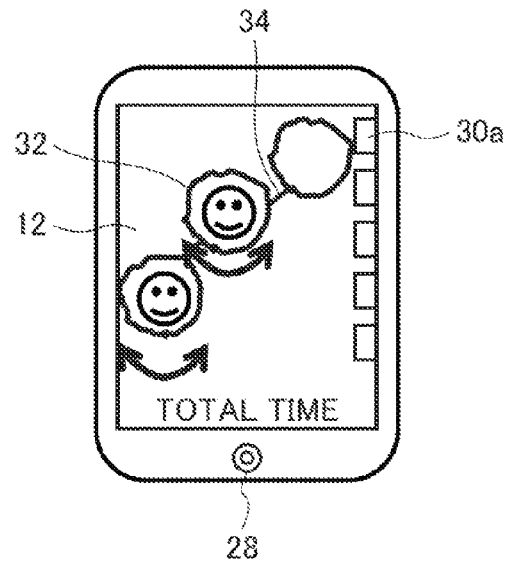
FIG. 4 is a conceptual diagram illustrating a state of swing reproduction as an image display procedure.

When the touch operation detection unit 14 detects the above touch operation, the display control unit 20 sequentially pulls out (the main subject areas 32 of) images from the position of the first tag button 30a, and displays the images while sequentially moving the images in the direction in which the finger is slid, as illustrated in FIG. 4. When the number of images being displayed exceeds predetermined number, the display control unit 20 hides the images exceeding the predetermined number in a display frame in as pulling-out order. For example, when the predetermined number is 3, the display control unit 20 pulls out and displays the fourth image, and hides the first image.

In contrast, when the touch operation detection unit 14 detects that the finger is slid in an opposite direction, the display control unit 20 sequentially moves the images being displayed, in a direction in which the finger is slid in the opposite direction. Further, the display control unit 20 sequentially displays images that have been hidden since the number of images being displayed exceeds the predetermined number, in an order that is reverse to the hiding order, and sequentially pushes back the images being displayed to the position of the first tag button in an order that is reverse to the pulling-out order to thereby hide the images.

Here, in this embodiment, the images being displayed are displayed with swing like a pendulum. Thus, as the images are displayed with swing like a pendulum, the favorite images can be expressed with sweet emphasis.

Further, when the touch operation detection unit 14 detects that the main subject area 32 of the image being displayed has been tapped, the display control unit 20 displays an entire area of the image of which the main subject area 32 has been tapped.

Further, when the touch operation detection unit 14 detects that the main subject area 32 of the image being displayed has been pinched out (opened so as to spread an operation target with two fingers) or pinched in (closed so as to pinch an operation target with two fingers), the display control unit 20 displays the entire area of the image of which the main subject area 32 has been pinched out or pinched in, in an enlarged or reduced manner.

The display of the entire area of the image or the enlarged or reduced display of the image is not limited to the swing reproduction, and is similar in other reproduction modes. Consequentially, the user can view the entire area of the image anytime.

Further, the display control unit 20 displays a line 34 that connects two images having a consecutive display order at the same time as displaying the images. Also, when the two images having a consecutive display order are adjacent images, the display control unit 20 displays the line 34 with a color indicating the fact. The display control unit 20, for example, displays the line 34 with green when the images are not adjacent images, and displays the line 34 with red when the images are adjacent images. Accordingly, the user can recognize whether the images are the adjacent images or not at first sight.

Alternatively, the display control unit 20 may display the line 34 with a length corresponding to a difference in photographing date and time between the two images having a consecutive display order, thereby the user can similarly recognize the difference in photographing date and time between the two images at first sight.

Further, in the case of this embodiment, the display control unit 20 displays the total time information in a central portion on the lower side of the screen of the touch panel 12. Accordingly, the user can recognize, at first sight, an elapsed time from the start of photographing of the images included within the category to a present time. The user can determine a timing of discard of unnecessary images or a timing of review of images by using the total time information as a criterion for determining that the images included within the category are to be organized.

Further, when an image captured in the same time zone as the image being displayed is included among images in the other category, the display control unit 20 displays mutual information indicating the fact, or when an image for which a display frame having the same shape as the display frame indicating the main subject area of the image being displayed is specified based on the frame information of the respective images is included among the images in the other category, the display control unit 20 displays spatial information indicating the fact. For example, the mutual information or the spatial information can be displayed by blinking the tag button corresponding to the other category. Consequentially, reproduction and display can be performed in consideration of mutuality and spatiality of the respective images.

Then, when a second tag button from the top (a second tag button) 30*b* is tapped among the five tag buttons, the display control unit 20 starts the seesaw reproduction.

Figure 5:
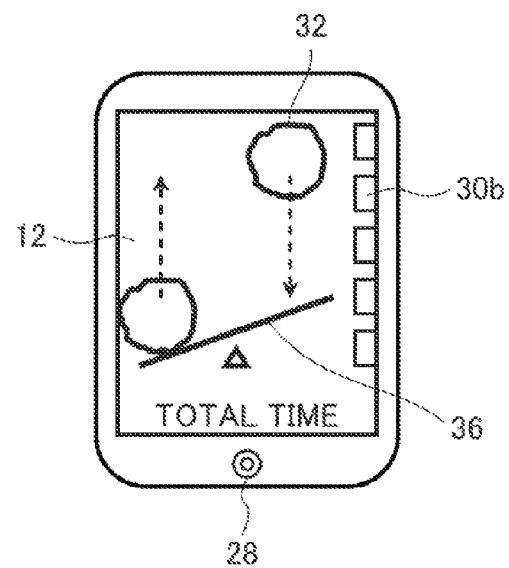
FIG. 5 is a conceptual diagram illustrating a state of seesaw reproduction as an image display procedure.

When the touch operation detection unit 14 detects that the second tag button 30*b* has been tapped, the display control unit 20 displays an image of a seesaw 36 on the screen of the touch panel 12, as illustrated in FIG. 5.

Then, (the main subject area 32 of) the image is displayed on the upper side of the screen of the touch panel 12 and then moved to be dropped from the upper side of the screen onto one end portion of the seesaw 36 (an end portion on the right side in FIG. 5). When the one end portion of the seesaw 36 is moved down and the other end portion (an end on the left side in FIG. 5) is moved up according to the movement of the image, an image on the other end portion of the seesaw 36 is moved to the upper side, of the screen to be moved upward and hidden.

Then, similarly, a next image is displayed on the upper side of the screen of the touch panel 12 and then moved from the upper side of the screen onto the other end portion of the seesaw 36. When the other end portion of the seesaw 36 is moved down and the one end portion is moved up according to the movement of the next image, the image on the one end portion of the seesaw 36 is moved to the upper side of the screen and hidden.

Thereafter, the operation of the seesaw 36 is repeated.

Further, when two images having a consecutive display order are adjacent images, the display control unit 20 displays the seesaw 36 with a color indicating the fact.

Similarly, the display control unit 20 displays the total time information, the mutual information, and the spatial information.

Then, when a third tag button from the top (a third tag button) 30*c* is tapped among the five tag buttons, the display control unit 20 starts the bubble reproduction.

Figure 6:
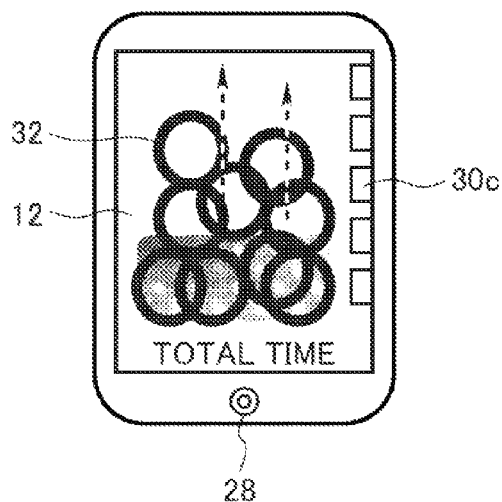
FIG. 6 is a conceptual diagram illustrating a state of bubble reproduction as an image display procedure.

When the touch operation detection unit 14 detects that the third tag button 30*c* has been tapped, the display control unit 20 sequentially displays (the main subject areas 32 of) the images so that bubbles are generated on the lower side of the screen of the touch panel 12, and sequentially over the images from the lower side of the screen to the upper side thereof so that the bubbles are moved upward and hidden, as illustrated in FIG. 6.

Further, when two images having a consecutive display order are adjacent images, the display control unit 20 displays a background of the touch panel 12 with a color indicating the fact.

Similarly, the display control unit 20 displays the total time information, the mutual information, and the spatial information.

Then, when a fourth tag button from the top (a fourth tag button) 30*d* is tapped among the five tag buttons, the display control unit 20 starts the touch reproduction.

Figure 7:
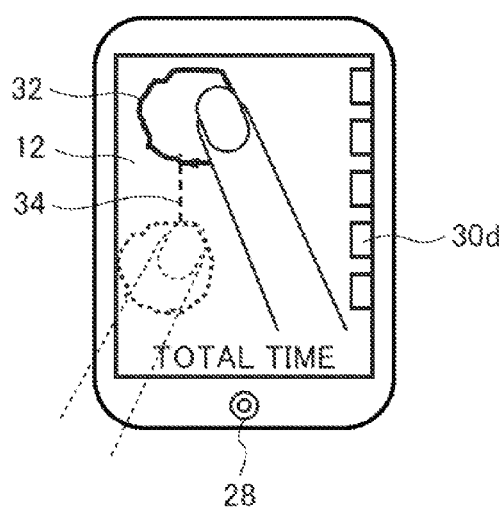
FIG. 7 is a conceptual diagram illustrating a state of touch reproduction as an image display procedure.

In the touch reproduction, an arbitrary position on the screen of the touch panel 12 is tapped after the fourth tag button 30*d* is tapped, as illustrated in FIG. 7.

When the touch operation detection unit 14 detects that the screen of the touch panel 12 has been tapped, the display control unit 20 hides (the main subject area 32 of) the image being displayed and displays (the main subject area 32 of) a next image in the tapped position on the screen. Thereafter, this operation is repeated each time the screen is tapped.

In the touch reproduction, not only the user can cause images desired to be viewed by the user or images desired to be shown to other persons to be sequentially displayed by sequentially tapping the screen of the touch panel 12, but also the user and the other persons can cause the images to be sequentially displayed by sequentially tapping the screen.

Further, when two images having a consecutive display order are adjacent images, the display control unit 20 displays a line 34 that connects the two consecutive images having a consecutive display order with a color indicating the fact during a predetermined period of time. In the touch reproduction, one of the two consecutively displayed images is not displayed. In order to represent this, in this embodiment, the two images are connected by a dotted line.

Similarly, the display control unit 20 displays the total time information, the mutual information, and the spatial information.

Then, when a fifth tag button from the top (a fifth tag button) 30*e* is tapped among the five tag buttons, the display control unit 20 starts the tempo reproduction.

Figure 8:
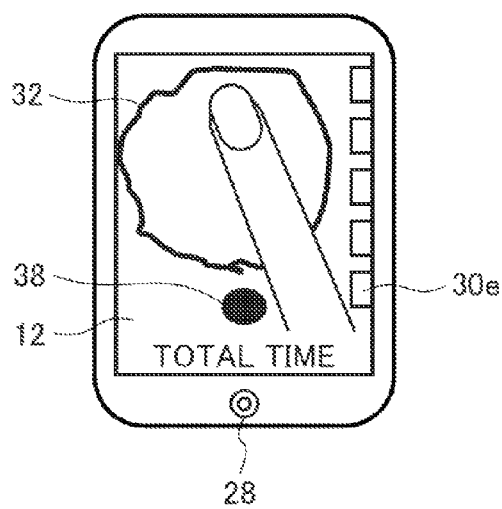
FIG. 8 is a conceptual diagram illustrating a state of tempo reproduction as an image display procedure.

In the tempo reproduction, after the fifth tag button 30*e* is tapped, the screen of the touch panel 12 is repeatedly tapped at any tempo for specifying a switching timing of an image, as illustrated in FIG. 8.

When the touch operation detection unit 14 detects the above touch operation, the display control unit 20 sequentially switches (the main subject areas 32 of) the images at a tempo at which the screen is repeatedly tapped, and displays the images.

Further, in the case of this embodiment, when two images having a consecutive display order are adjacent images, the display control unit 20 displays the adjacent image information 38 with a color indicating the fact in a central portion on the lower side of the screen of the touch panel 12.

Similarly, the display control unit 20 displays the total time information, the mutual information, and the spatial information.

In the image display device 10, the image display procedures corresponding to the existing tag buttons 30a to 30e can be changed or a new tag button corresponding to a newly set image display procedure can be added by the display procedure setting unit 22, as described above.

Hereinafter, calendar reproduction, map reproduction, layout reproduction, photographing place reproduction, and similar image reproduction will be described as preparatory image display procedures to be changed or newly added.

When a changed or newly added tag button (a sixth tag button) is tapped, the display control unit 20 starts the calendar reproduction.

Figure 9:
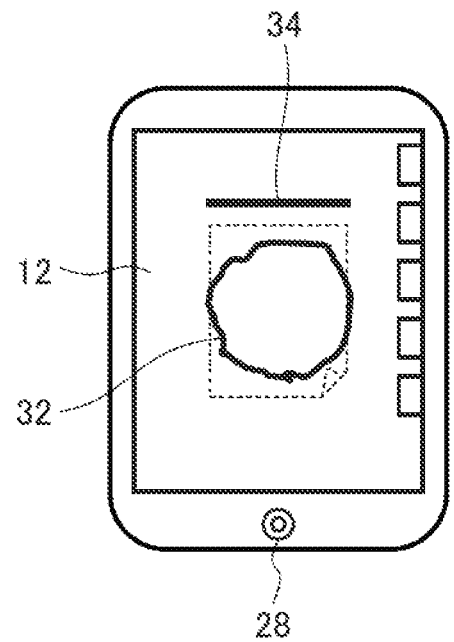
FIG. 9 is a conceptual diagram illustrating a state of calendar reproduction as an image display procedure.

When the touch operation detection unit 14 detects that the sixth tag button has been tapped, the display control unit 20 displays (the main subject area 32 of) the image in a daily pad calendar format on the screen of the touch panel 12, as illustrated in FIG. 9.

Then, when the touch operation detection unit 14 detects that a finger is slid from the lower side of the screen to the upper side thereof in a state in which the finger comes in contact with the screen of the touch panel 12, the display control unit 20 turns over the image being displayed like a daily pad calendar to hide the image and displays a next image.

In contrast, when the touch operation detection unit 14 detects that the finger is slid from the upper side of the screen to the lower side thereof in a state in which the finger comes in contact with the screen of the touch panel 12, the display control unit 20 turns back the previous image and hides the image being displayed, to display the previous image.

When two images having a consecutive display order are adjacent images, the display control unit 20 displays a line 34 that indicates a binding portion of the image displayed in a daily pad calendar format with a color indicating the fact.

Similarly, the display control unit 20 displays the total time information, the mutual information, and the spatial information.

Then, when a changed or newly added tag button (a seventh tag button) is tapped, the display control unit 20 starts the map reproduction.

Figure 10:
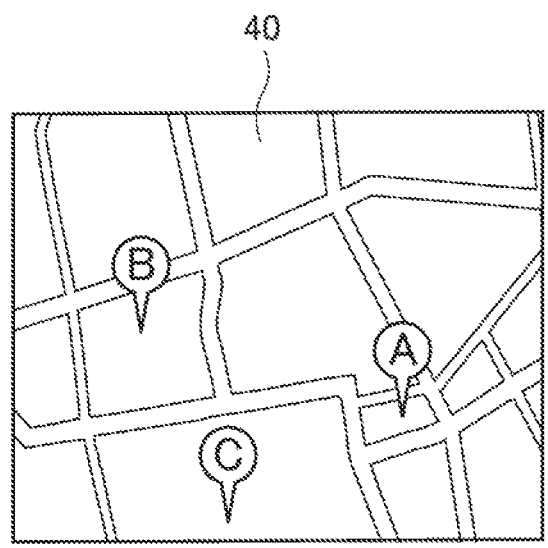
FIG. 10 is a conceptual diagram illustrating a state of map reproduction as an image display procedure.

When the touch operation detection unit 14 detects that the seventh tag button has been tapped, the display control unit 20 displays a map 40 on the screen of the touch panel 12 and displays predetermined icons A, B, C, . . . in positions on the map 40 at which the images have been captured, based on positional information when the images have been captured, as illustrated in FIG. 10.

In the map reproduction, for example, the positional information acquired in capturing the images using a global positioning System (GPS) function of the image display device 10 and Stored as header information (for example, Exif information) of image data of the captured images can be used.

Then, when a changed or newly added tag button (an eighth tag button) is tapped, the display control unit 20 starts the layout reproduction.

In the layout reproduction, after the eighth tag button is tapped, for example, (main subject areas 32 of) a predetermined number of images are tapped and selected in an order of recent photographing date and time using the swing reproduction, the seesaw reproduction, the bubble reproduction, the touch reproduction, the tempo reproduction, the calendar reproduction or the like described above.

When the touch operation detection unit 14 detects the above touch operation, the display control unit 20 arranges the predetermined number of selected images in the order of recent photographing date and time, reverses the top and bottom of each of the predetermined number of arranged images, and reverses the top and bottom of an entire region consisting of the predetermined number of images in each of which the top and bottom have been reversed.

Figure 11A:
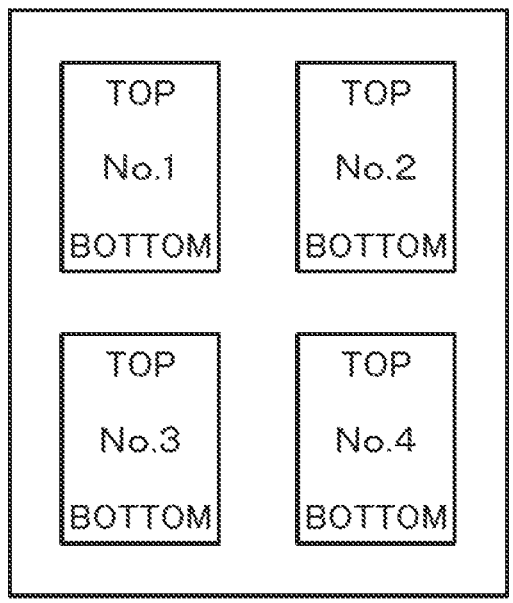
FIGS. 11A and 11B are conceptual diagrams illustrating a state of layout reproduction as an image display procedure.
Figure 11B:
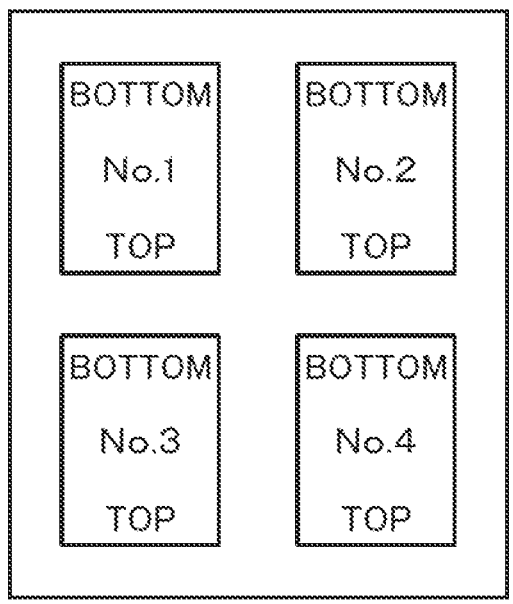

For example, a case in which four images of No. 1 to No. 4 are selected is considered. No. 1 to No. 4 are images having oldest photographing date and time in this order. In this case, the display control unit 20 arranges the four selected images in an order of recent photographing date and time of No. 1 to No. 4, as illustrated in FIG. 11A. Then, the display control unit 20 reverses the top and bottom of each of the four arranged images as illustrated in FIG. 11B, and reverses the top and bottom of an entire region consisting of the four images in each of which the top and bottom have been reversed.

In the layout reproduction, it is possible to improve a user's work efficiency by selecting and arranging the images in an order of recent photographing date and time that is reliably memorized, and also it is possible to display all images arranged in an order of oldest photographing date and time, which is reverse to the selection and arrangement order of the images, in a point symmetric manner by reversing the top and bottom of an entire region consisting of the all images.

For example, the layout reproduction is available for a layout of a photo hook, an electronic photo album or the like which can be viewed in an order of oldest photographing date and time.

Then, when a changed or newly added tag button (a ninth tag button) is tapped, the display control unit 20 starts the photographing place reproduction.

When the touch operation detection unit 14 detects that the ninth tag button has been tapped, the display control unit 20, for example, selects images captured at a predetermined place based on the positional information of when the images have been captured from among the images in the category selected by the image selection unit 18, and displays the images.

For example, when Tokyo is specified as the photographing place according to an instruction of the user, the display control unit 20 selects and displays images captured in Tokyo.

Alternatively, the display control unit 20, for example, can sort the images in the category selected by the image selection unit 18 or the images captured at selected places among the images in the category according to a distance from a photographing place of a certain image among the images to a photographing place of each image, and can display the images in a sorting order.

Further, the display control unit 20 can display the images captured at the selected place in an order of photographing date and time or in an order of evaluation values of similar images, or can display the images in a combination of the order of photographing date and time or the order of evaluation values of the similar images and the sorting order.

Further, by use of the above-described display switching unit, the display control unit 20 can also perform switching between displaying of the images in the category selected by the image selection unit 18 in an order of photographing date and time of the images, selecting of predetermined similar images from among the images in the category selected by the image selection unit 18 and displaying of the similar images in an order of evaluation values of the similar images, and displaying of the images in the category selected by the image selection unit 18 or the images captured at selected places in an order of distances from a photographing place of a certain image to photographing places of the respective images, as the predetermined order.

Then, when a changed or newly added tag button (a tenth tag button) is tapped, the display control unit 20 starts the similar image reproduction.

When the touch operation detection unit 14 detects that the tenth tag button has been tapped, the display control unit 20 selects predetermined similar images from among the images in the category selected by the image selection unit 18 and displays the similar images.

For example, when a predetermined image is specified by an instruction of the user, the display control unit 20 selects images similar to the image specified by the user and displays the similar images.

Next, a schematic operation of the image display device 10 according to the image display method of the present invention will be described with reference to a flowchart illustrated in FIG. 12.

Icons 26 of a plurality of application programs are displayed side by side on the screen of the touch panel 12, as illustrated in FIG. 1A.

In the case of this embodiment, the user taps the predetermined icon 26 with a finger through a touch operation to start up a program of the camera application that executes the image display method of the present invention (step S1). The user performs photographing of images or displaying of images using this camera application.

When the camera application is started up, the five tag buttons 30a to 30e are displayed side by side along the right side of the screen of the touch panel 12. Tag information indicating categories corresponding to the five tag buttons 30a to 30e are a favorite image, an image of concern, an important image, an image desired to be viewed and desired to be shown, and tentative photographing.

The user, first, taps and selects one of the five tag buttons 30a to 30e (step S2). In this embodiment, the first tag button 30a is assumed to be tapped and selected.

Then, in a state in which a finger is caused to come in contact with the screen of the touch panel 12 through a touch operation, the user traces the screen with the finger to draw and specify a display frame 42 indicating an area in which a main subject is included (a main subject area) in an image to be captured now, as illustrated in FIG. 13A (step S3).

When the user specifies the display frame 42 indicating the main subject area, the touch operation detection unit 14 detects information (frame information) of the display frame 42 indicating the main subject area.

Here, it is preferable for the display frame indicating the main subject area to be a closed loop, but when the display frame is not a closed loop, a start point and an end point of the drawing may be connected to form a closed loop, and then the frame information may be detected. A shape of the display frame 42 indicating the main subject area may be an arbitrary shape as illustrated in FIG. 13B, in addition to, for example, a circle, a triangle, or a quadrangle. Further, the frame information may be any information as long as the information can specify the main subject area, in addition to an encircling line surrounding the main subject area.

Further, the display frame 42 indicating the main subject area may be set each time one image is captured, or when the display frame 42 indicating the main subject area is not set, information of a previously set display frame or information of a default display frame used when the display frame is not set can be used.

After drawing and specifying the display frame 42 indicating the main subject area, the user causes the main subject to be included in the display frame 42 indicating the main subject area, and then pushes the shutter button 28. In response thereto, the image capturing unit 24 captures an image (step S4), and gives tag information indicating the category corresponding to the first tag button 30a tapped and selected by the user and frame information specified by the user to the image data of the captured image (step S5). The image data of the image to which the tag information indicating the category and the frame information have been given is stored in the image storage unit 16 (step S6).

Thus, the tag information indicating a category and the frame information are specified, images are captured, and then, the specified tag information indicating a category and the frame information are given to the captured images. Accordingly, it is possible to greatly reduce effort and time in manually giving the tag information indicating a category and the frame information to the respective images after the images are captured. In contrast, manually giving the tag information indicating a category and the frame information to the captured images requires a lot of effort and time and is difficult, as will be described below. Further, a large number of captured images may be automatically sorted in a folder for sorting based on the tag information indicating a category.

Further, existing images captured using other digital cameras, as well as the images captured by the image display device 10 using a camera application, may be stored in the image storage unit 16. In this case, since the tag information indicating a category and the frame information are not contained in these images, it is necessary to separately give these pieces of information. For example, the tag information indicating a category can be manually set by the user, and the frame information can be manually set by the user or automatically set using default frame information.

Next, the user taps and selects one of the five tag buttons 30a to 30e (step S7). In the case of this embodiment, the first tag button 30a is assumed to be tapped and selected.

In response thereto, the image selection unit 10 selects the images in the category corresponding to the tag information indicating a category specified through the touch operation from among the images stored in the image storage unit 16 based on the tag information indicating a category (step S8).

Then, the display control unit 20 extracts the main subject areas of the images in the category selected by the image selection unit 18 based on the frame information, and displays the extracted main. Subject areas on the screen of the touch panel 12 in a predetermined order according to the image display procedure corresponding to the tag information indicating a category specified through the touch operation (step S9).

In the case of this embodiment, the display control unit 20 starts the swing reproduction. A specific image display procedure of the swing reproduction is as described above. That is the display control unit 20 pulls out (a main subject area of) an image from the position of the first tag button 30a, displays the main subject area of each image based on the frame information indicating a main subject area, and displays the image being displayed with swing like a pendulum.

Thus, in the image display device 10, it is possible to select the images in the category corresponding to the tag information indicating a category specified through the touch operation from a large number of images stored in the image storage unit 15, extract the main subject areas that are attention areas of most interest for the user from the selected images in the category based on the frame information, and efficiently reproduce and display the extracted main subject areas on the screen of the touch panel 12 in a predetermined order according to the image display procedure corresponding to the tag information indicating a category specified through the touch operation.

It is not essential to start up and use the camera application. For example, when the image display device 10 is a digital camera, this can be considered to be the same as a state in which the camera application has been already started up in the portable terminal such as a smartphone.

For example, the image display method of the present invention can be performed by a program for causing a computer to execute respective steps of the image display method. For example, this program can be recorded on a computer-readable recording medium and provided.

The present invention is basically as described above.

Up to now, the present invention has been described in detail, But needless to say, present invention is not limited to the above embodiments and may be improved or modified in various ways within.

What is claimed is:

1. An image display device that displays an image to which tag information indicating a category and frame information indicating a main subject area have been given, the device comprising:
   a touch panel configured to receive an instruction input through a touch operation performed by a finger of a user coming in contact with a screen of the touch panel;
   a touch operation detection unit configured to detect the touch operation of the user input through the touch panel;
   an image storage unit configured to store the image to which the tag information and the frame information have been given;
   an image selection unit configured to select images in a category corresponding to the tag information specified through the touch operation from among the images stored in the image storage unit based on the tag information; and
   a display control unit configured to extract main subject areas of images in the category selected by the image selection unit based on the frame information, and display the extracted main subject areas on the screen of the touch panel in a predetermined order according to an image display procedure corresponding to the tag information specified through the touch operation.

2. The image display device according to claim 1, wherein when two images having a consecutive display order are adjacent images between which a difference in photographing date and time is equal to or less than a predetermined period of time, the display control unit displays adjacent image information indicating a fact.

3. The image display device according to claim 1, wherein when two images having a consecutive display order are similar images, the display control unit displays similar image information indicating a fact.

4. The image display device according to claim 1, wherein when an image captured in a same time zone as an image being displayed is included in images in another category, the display control unit displays mutual information indicating a fact.

5. The image display device according to claim 1, wherein when an image for which a display frame having a same shape as a display frame indicating a main subject area of an image being displayed is specified based on the frame information is included among images in another category, the display control unit displays spatial information indicating a fact.

6. The image display device according to claim 1, wherein the display control unit displays total time information indicating a time difference between an image having an oldest photographing date and time and an image having a most recent photographing date and time among the images in the category corresponding to the tag information specified through the touch operation.

7. The image display device according to claim 1, wherein the image selection unit selects an image in a category corresponding to a tag button specified through the touch operation among a predetermined number of tag buttons corresponding to the tag information, which are displayed on the screen of the touch panel.

8. The image display device according to claim 7, wherein a first tag button is tapped, and thereafter when the touch operation detection unit detects than the finger has been slid in an arbitrary direction in a state in which the finger comes in contact with the first tag button, the display control unit sequentially puns out images from the position of the first tag button and displays the images while moving the images in a direction in which the finger has been slid, and sequentially hides the images exceeding a predetermined number in a pulling-out order when the number of images being displayed exceeds the predetermined number, and
when the touch operation detection unit detects that the finger has been slid in an opposite direction, the display control unit sequentially moves the images being displayed in a direction in which the finger has been slid in the opposite direction, sequentially displays the hidden images in an order that is reverse to a hiding order, and sequentially pushes back the images being displayed to the position of the first tag button in an order that is reverse to the pulling-out order to hide the images.

9. The image display device according to claim 7, wherein when the touch operation detection unit detects that a second tag button has been tapped, the display control unit displays an image of a seesaw on the screen of the touch panel; an image is moved from an upper side of the screen onto one end portion of the seesaw; according to a movement of the image, the one end portion is moved down and an other end portion of the seesaw is moved up, and an image on the other end portion is moved to the upper side of the screen and hidden; subsequently, a next image is moved from the upper side of the screen onto the other end portion; according to the movement of the next image, the other portion is moved down and the one end portion is moved up, and the image on the one end portion is moved to the upper side of the screen and hidden; and thereafter, an operation of the seesaw is repeated.

10. The image display device according to claim 7, wherein when the touch operation detection unit detects that a third tag button has been tapped, the display control unit sequentially displays images on a lower side of the screen of the touch panel, and sequentially moves the images from the lower side of the screen to the upper side thereof to hide the images.

11. The image display device according to claim 7, wherein a fourth tag button is tapped, and thereafter when the touch operation detection unit detects that an arbitrary position on the screen of the touch panel has been tapped, the display control unit hides an image being displayed and displays a next image in the tapped position on the screen.

12. The image display device according to claim 7, wherein a fifth tag button is tapped, and thereafter when the touch operation detection unit detects that the screen of the touch panel has been repeatedly tapped at any tempo, the display control unit sequentially displays images at a tempo at which the screen has been repeatedly tapped.

13. The image display device according to claim 7, wherein when the touch operation detection unit detects that a sixth tag button has been tapped, the display control unit displays an image in a daily pad calendar format on the screen of the touch panel, when the touch operation detection unit detects that the finger has been slid from a lower side of the screen to an upper side thereof in a state in which the finger comes in contact with the screen of the touch panel, the display control unit turns over and hides the image being displayed and displays a next image, and when the touch operation detection unit detects that the finger has been slid from the upper side of the screen to the lower side in a state in which the finger comes in contact with the screen of the touch panel, the display control unit turns back a previous image to hide the image being displayed and displays the previous image.

14. The image display device according to claim 7, wherein when the touch operation detection unit detects that a seventh tag button has been tapped, the display control unit displays a map on the screen of the touch panel, and displays a predetermined icon in a position on the map at which an image has been captured, based on positional information when the image has been captured.

15. The image display device according to claim 7, wherein an eighth tag button is tapped, and thereafter when the touch operation detection unit detects that a predetermined number of images are tapped and selected in an order of recent photographing date and time, the display control unit arranges the predetermined number of selected images in an order of recent photographing date and time, reverses a top and bottom of each of the predetermined number of arranged images, and reverses a top and bottom of an entire region consisting of the predetermined number of images in each of which the top and bottom have been reversed, thereby displaying all of the predetermined number of images arranged in an order of oldest photographing date and time.

16. The image display device according to claim 7, wherein when the touch operation detection unit detects that a ninth tag button has been tapped, the display control unit selects an image captured at a predetermined place from among the images in the category selected by the image selection unit based on positional information when the image has been captured, and displays the image.

17. The image display device according to claim 7, wherein when the touch operation detection unit detects that a tenth tag button has been tapped, the display control unit selects predetermined similar images from among the images in the category selected by the image selection unit, and displays the similar images.

18. The image display device according to claim 7, further comprising a display procedure setting unit configured to have a function of changing image display procedures corresponding so existing tag buttons through the touch operation.

19. The image display device according to claim 7, further comprising an image capturing unit configured to capture the image, wherein the image capturing unit gives tag information corresponding to the tag button tapped through the touch operation to the captured image.

20. An image display method for displaying an image to which tag information indicating a category and frame information indicating a main subject area have been given, the method comprising:

a touch operation detection step of detecting a touch option of a user that is input through a touch and that receives an instruction input through the touch operation performed by a finger of the user coming in contact with a screen of the touch panel;

an image selection step of selecting images in a category corresponding to the tag information specified through the touch operation from among images which are stored in an image storage unit and to which the tag information and the frame information have been given, based on the tag information; and an image display step of extracting main subject areas of the selected images in the category based on the frame information, and displaying the extracted main subject areas on the screen of the touch panel in a predetermined order according to an image display procedure corresponding to the tag information specified through the touch operation.

21. A non-transitory computer-readable recording medium having a program recorded thereon for causing a computer to execute the respective steps of the image display method of claim 20.

* * * * *